(12) United States Patent
Dave et al.

(10) Patent No.: US 9,882,910 B2
(45) Date of Patent: Jan. 30, 2018

(54) SECURITY AUTHORIZATION FOR SERVICE LEVEL AGREEMENTS

(71) Applicant: CA, Inc., New York, NY (US)

(72) Inventors: Chirag Dave, Plano, TX (US); Ambili Pallimakkal, Lewisville, TX (US); John Williamson, Broomfield, CO (US); Parag Dave, Thornton, CO (US)

(73) Assignee: CA, Inc., New York, NY (US)

( * ) Notice: Subject to any disclaimer, the term of this patent is extended or adjusted under 35 U.S.C. 154(b) by 94 days.

(21) Appl. No.: 14/862,805

(22) Filed: Sep. 23, 2015

(65) Prior Publication Data
US 2017/0085574 A1    Mar. 23, 2017

(51) Int. Cl.
*H04L 29/06*    (2006.01)
*G06F 21/00*    (2013.01)

(52) U.S. Cl.
CPC ............ *H04L 63/102* (2013.01); *G06F 21/00* (2013.01)

(58) Field of Classification Search
CPC ...... H04L 63/102; H04L 69/102; G06F 11/30; G06F 3/048; G06F 9/46; G06F 21/00
See application file for complete search history.

(56) References Cited

U.S. PATENT DOCUMENTS

| | | | | |
|---|---|---|---|---|
| 6,256,773 B1* | 7/2001 | Bowman-Amuah | ..... | G06F 8/71 707/999.202 |
| 7,386,586 B1* | 6/2008 | Headley | ................ | G06F 9/5033 709/201 |
| 8,332,689 B2* | 12/2012 | Timashev | ........... | G06F 11/1469 714/15 |
| 8,555,273 B1* | 10/2013 | Chia | ....................... | G06F 8/665 717/168 |
| 2003/0088534 A1* | 5/2003 | Kalantar | ................. | G06Q 10/06 706/50 |
| 2004/0243751 A1* | 12/2004 | Rabaioli | ................... | G06F 9/52 710/240 |
| 2006/0047554 A1* | 3/2006 | Larsen | .................. | G06F 19/327 705/7.24 |

(Continued)

OTHER PUBLICATIONS

Wei, Xiaohui, et al. "Integrating local job scheduler—LDF TM with Gfarm TM." International Symposium on Parallel and Distributed Processing and Applications. Springer Berlin Heidelberg, 2005.*

(Continued)

*Primary Examiner* — Chau Le
(74) *Attorney, Agent, or Firm* — Coats & Bennett, PLLC

(57) ABSTRACT

A computer device receives a command from a user to generate a view for display to a user in a graphical user interface (GUI). The view displays job execution data for a job, such as a print job for example, being handled by a job scheduler and one or more constituent sub-jobs that are performed in execution of the job. Prior to generating the view, however, the computer device determines whether the user is authorized to view details about the job based on the user's assigned permissions level. If the user is authorized for the job, the device ignores the permissions level and temporarily authorizes the user for limited access to any sub-job for which the user may not be authorized. For example, the temporary authorization may allow the user to see job execution details for a restricted sub-job on the view, but not alter or control, the sub-job.

15 Claims, 7 Drawing Sheets

(56) References Cited

U.S. PATENT DOCUMENTS

| | | | | |
|---|---|---|---|---|
| 2006/0075503 A1* | 4/2006 | Bunker | ................ | G06F 11/324 |
| | | | | 726/25 |
| 2007/0294697 A1* | 12/2007 | Theimer | ............... | G06F 9/5027 |
| | | | | 718/102 |
| 2008/0005535 A1* | 1/2008 | Sodani | .................... | G06F 9/384 |
| | | | | 712/214 |
| 2008/0184248 A1* | 7/2008 | Barua | ................... | G06F 9/4843 |
| | | | | 718/104 |
| 2008/0209417 A1* | 8/2008 | Jakobson | ............. | G06F 9/4856 |
| | | | | 718/100 |
| 2013/0117840 A1* | 5/2013 | Roesner | ............. | G06F 21/6281 |
| | | | | 726/17 |
| 2013/0139170 A1* | 5/2013 | Prabhakar | ............. | G06F 9/4893 |
| | | | | 718/104 |
| 2013/0311995 A1* | 11/2013 | McKenney | ............. | G06F 9/524 |
| | | | | 718/102 |
| 2016/0170811 A1* | 6/2016 | Peacock | .................... | G06F 9/52 |
| | | | | 718/106 |

OTHER PUBLICATIONS

Li, Bo, et al. "Enacloud: An energy-saving application live placement approach for cloud computing environments." Cloud Computing, 2009. CLOUD'09. IEEE International Conference on. IEEE, 2009.*

Goss-Walter et al., "An Analysis of the UNICORE Security Model", Published Jul. 2003, Retrieved From https://pdfs.semanticscholar.org/104e/b92c30b94549edd5cc217180b5426b47e40a.pdf.*

Brochu et al., "Ganga: a tool for computational-task management and easy access to Grid resources", Published Jul. 2009, Retrieved From https://pdfs.semanticscholar.org/edca/98623c85f5139509469ffb9f8c4648a92eeb.pdf.*

* cited by examiner

SECURITY AUTHORIZATION FOR SERVICE LEVEL AGREEMENTS

BACKGROUND

The present disclosure relates to computing devices that monitor job schedulers, and more particularly, to computing devices that temporarily authorize users for limited interaction with one or more jobs.

Computing devices often perform jobs for users such as print jobs, media jobs, and the like. Jobs may be performed on a single platform, or across multiple platforms, but generally comprise a collection of one or more related application programs that are executed to perform the job, as well as instream data and a series of Job Control Language (JCL) statements. In some cases, jobs may be hierarchical, and thus, a given job may consist of one or more other jobs that are performed in sequence. In such cases, the successful execution of the top level job is dependent on the successful execution of all of its constituent jobs. Similarly, the successful execution of any constituent job may be a prerequisite for executing a subsequent constituent job.

Conventional job scheduler functions enforce authorization policies on individual jobs, as well as groups of jobs. Such authorization policies, however, simply limit whether users can view job details and define how users can interact with a job. For example, users with sufficient authorization may be able to start, pause, and stop the job, as well as view an indicator of whether the job executed successfully. However, not only can users without sufficient authorization not control a given job, they may not be able to determine whether the execution of the job succeeded or failed.

BRIEF SUMMARY

The present disclosure provide a user with at least some limited access to the job execution details of a job regardless of whether that user is sufficiently authorized to access or view details about the job. More particularly, one embodiment of the present disclosure provides a computer-implemented method that calls for receiving a command to generate a view for a job. The job comprises a plurality of related sub-jobs that are executed to perform the job, and the plurality of sub-jobs comprises a restricted sub-job that a user is not authorized to access. The method then calls for determining whether the job is an authorized job that the user is authorized to access, or a restricted job that the user is not authorized to access, based on a job privilege level for the job assigned to the user. If the job is an authorized job, the method calls for ignoring the job privilege level for the user, temporarily authorizing the user for limited access to the restricted sub-job, and generating the view for display to the user, wherein the view comprises a graphical indicator representing the restricted first sub-job. The method then calls for outputting the view on a graphical user interface (GUI) on a display device to the user.

In another embodiment, the present disclosure provides a computing device comprising a communications interface circuit and a processing circuit. The communications interface circuit is configured to communicate data with a job scheduler. The processing circuit is operatively connected to the communications interface circuit and is configured to receive a command to generate a view for a job comprising a plurality of related sub-jobs that are executed to perform the job, wherein the plurality of sub-jobs comprises a restricted sub-job that a user is not authorized to access, and determine whether the job is an authorized job that a user is authorized to access, or a restricted job that the user is not authorized to access, based on a job privilege level for the job assigned to the user. If the job is a restricted job, the processing circuit ignores the job privilege level for the user, temporarily authorizes the user for limited access to the restricted sub-job, and generates the view for display to the user, wherein the view comprises a graphical indicator representing the restricted job. The processing circuit then outputs the view to a graphical user interface (GUI) on a display device.

In another embodiment, the present disclosure provides a computer-readable storage medium comprising computer program code stored thereon that, when executed by a processing circuit of a computing device, configures the processing circuit to receive a command to generate a view for a job. The job comprises a plurality of related sub-jobs that are executed to perform the job, at least one of which is a restricted sub-job that a user is not authorized to access. The computer program code further configures the processing circuit to determine whether the job is an authorized job that a user is authorized to access, or a restricted job that the user is not authorized to access, based on a job privilege level for the job assigned to the user. If the job is a restricted job, the computer program code further configures the processing circuit to ignore the job privilege level for the user, temporarily authorize the user for limited access to the restricted sub-job, and generate the view for display to the user, wherein the view comprises a graphical indicator representing the restricted sub-job. The computer program code then configures the processing circuit to output the view to a graphical user interface (GUI) on a display device.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
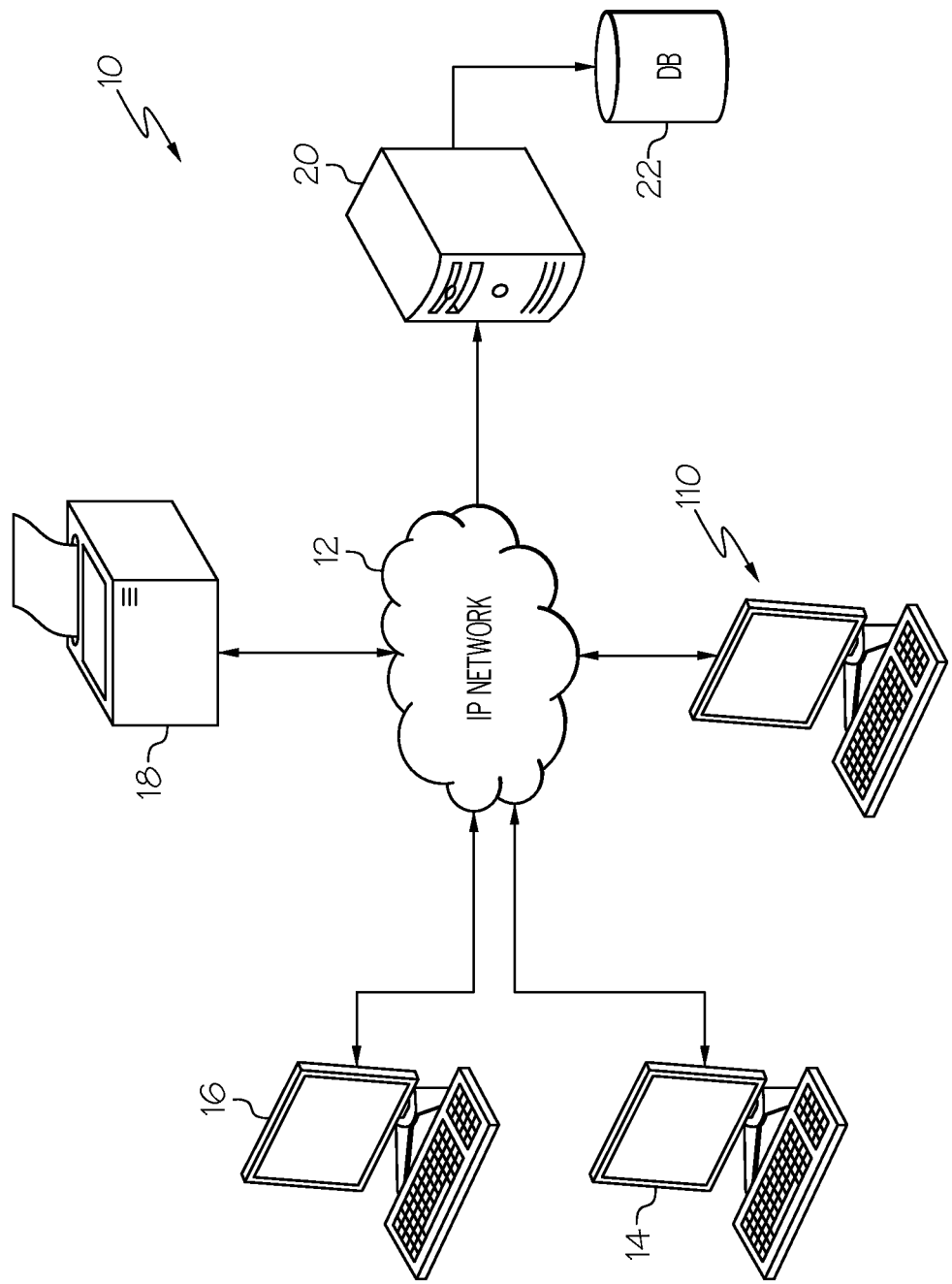
FIG. 1 is a block diagram illustrating some functional components of a communications network configured according to the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, embodiments of the present disclosure provide users with at least some limited access to a job despite the fact that the specific permissions level for a user may prohibit access to the job. Particularly, embodiments of the present disclosure monitor a job scheduler for information related to the execution of one or more jobs. That information may be displayed in a "view" on a graphical user interface (GUI) so that a user who requested the view can determine the status of the jobs. Such statuses may include information such as the name of a job, the start/end times of a job, and a status indicator for the job that indicates whether execution of the job succeeded, failed, or is in progress.

Normally, views are generated based on the user's authorization level with respect to the jobs. Thus, views are generated to only include information associated with jobs for which a user has sufficient authorization. While this permits users to discern the execution success or failure of some jobs, it prohibits them from knowing the success or failure of jobs for which they lack sufficient authorization.

More particularly, some jobs comprise one or more sub-jobs—each of which performs a given function in completion of the job. While users are permitted view information on jobs and sub-jobs for which they are authorized, they cannot view such information on jobs and sub-jobs for which they are not authorized. As such, if a job "fails" to complete because a constituent sub-job for which the user did not have sufficient access failed, the user may not know what caused the failure. Therefore, according to the present disclosure, a control computer configured according to embodiments of the present disclosure allows a user to view the information for a job even if the user lacks sufficient authorization for the job.

More particularly, in one embodiment, the control computer receives a command (e.g., a user command) to display information about a job, and in response, retrieves the information about the job from a job scheduler. The control computer then determines whether the user is sufficiently authorized for the job. If so, the control computer generates the view to include the information for display on the GUI to a user. More specifically, the control computer ignores the authorization level currently assigned to the user and automatically temporarily assigns an upgraded authorization level to the user for each of the constituent sub-jobs. This temporary authorization upgrade merely authorizes the user for specific, predefined limited interaction with the sub-job. For example, the user may be given "read" access to the sub-job, but will still not be able to control any of the sub-job functions. With the temporary authorization complete, the control computer generates the view to include the information for the job and all the constituent sub-jobs, regardless of whether the user does or does not normally have sufficient authorization, and outputs the view to the GUI for display to the user.

Turning now to the drawings, FIG. 1 is a functional block diagram that illustrates a communications network 10 suitable for use in one embodiment. As seen in FIG. 1, network 10 comprises an IP network 12 that communicatively connects one or more user terminals 14, 16 and a control computer 110 to a network server device 20. Additionally, server device 20, which may comprise an application server (AS), for example, is operatively connected to a data storage device (DB) 22.

Generally, the user terminals 14, 16 communicate with applications executing on server device 20. For example, user terminals 14, 16 may store data to, and retrieve data from, the data storage device 22 in a series of transactions, or request that server device 20 send data to a printer 18 (e.g., a print job). In another example, user terminals 14, 16 may request server device 20 to render a media file (e.g., a video or audio file) on a specified device, which may or may not be on the same platform as the user terminals 14, 16, or even in the same network 10.

Regardless of the particular action to be performed, however, server device 20 is configured to perform such actions as jobs. To that end, server device 20 may be configured to execute a job scheduler. As is known in the art, a job scheduler controls the execution of jobs, which as stated above, may comprise one or more different, but related and dependent, application programs. Additionally, however, job schedulers may also perform other functions. These include, but are not limited to, defining workflows and/or job dependencies, providing interfaces that allow other applications to monitor the execution of jobs, prioritizing the execution order of the jobs according to one or more predetermined policies, and the like.

The control computer 110, which is described in more detail later, executes a control program configured to interface with the job scheduler executing on server device 20. With the control program, control computer 110 monitors job execution, retrieves data regarding the job execution of a job, generates GUI views to display the data, and outputs the GUI views to a display device for a user.

Conventionally, control computers only displayed information associated with jobs that the user was authorized to view. Therefore, it was not possible for users lacking sufficient authorization for a job to determine whether the execution of that job succeeded or failed. However, with control computer 110 of the present disclosure, users are able to see at least some information about a job regardless of whether they are or are not authorized for that job. This means that, with a control computer 110 configured according to embodiments of the present disclosure, users are able to at least determine whether the execution of a job of interest has succeeded or failed.

Figure 2A:
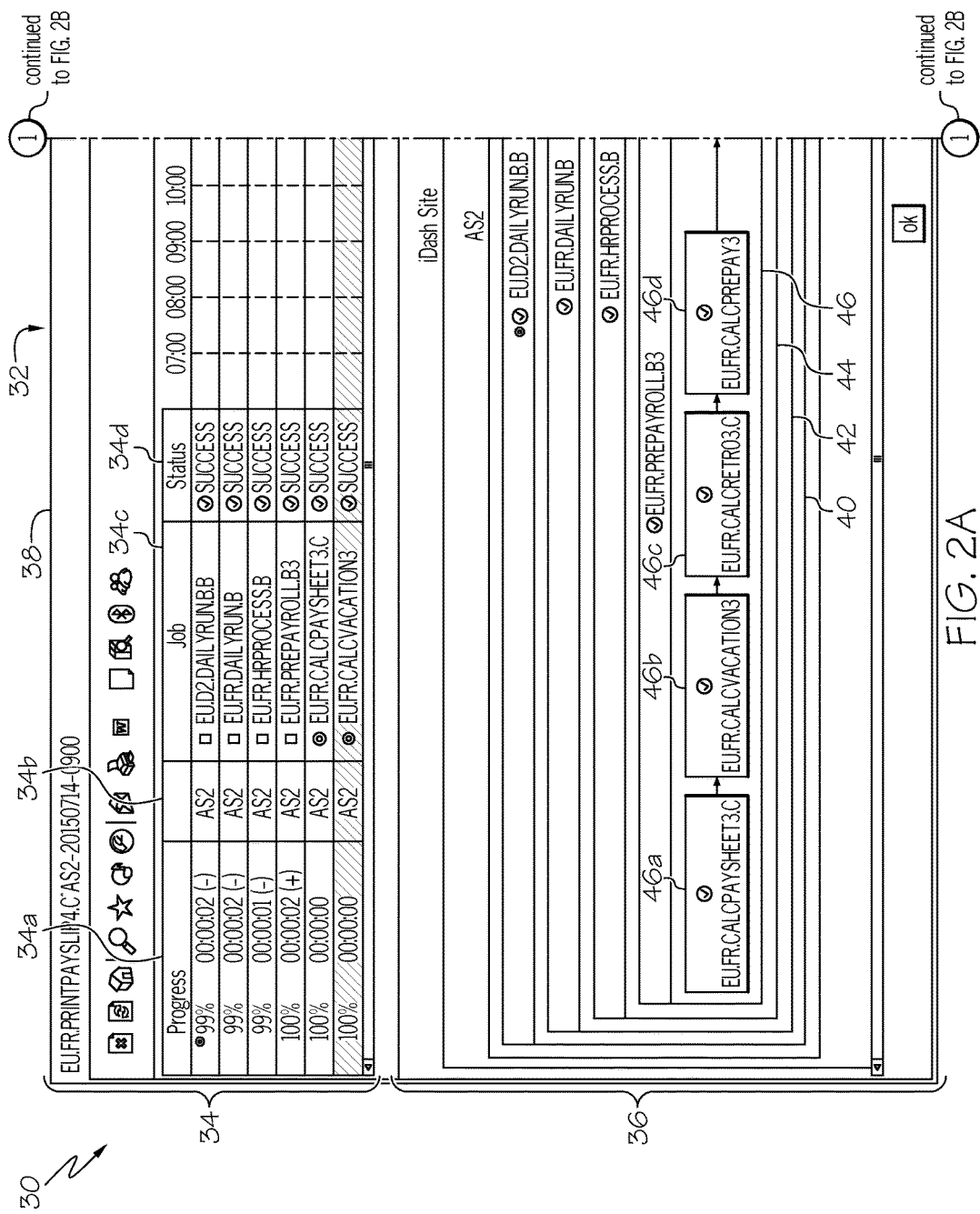
FIGS. 2A-2B illustrate an exemplary graphical user interface configured to display information according to embodiments of the present disclosure.
Figure 2B:
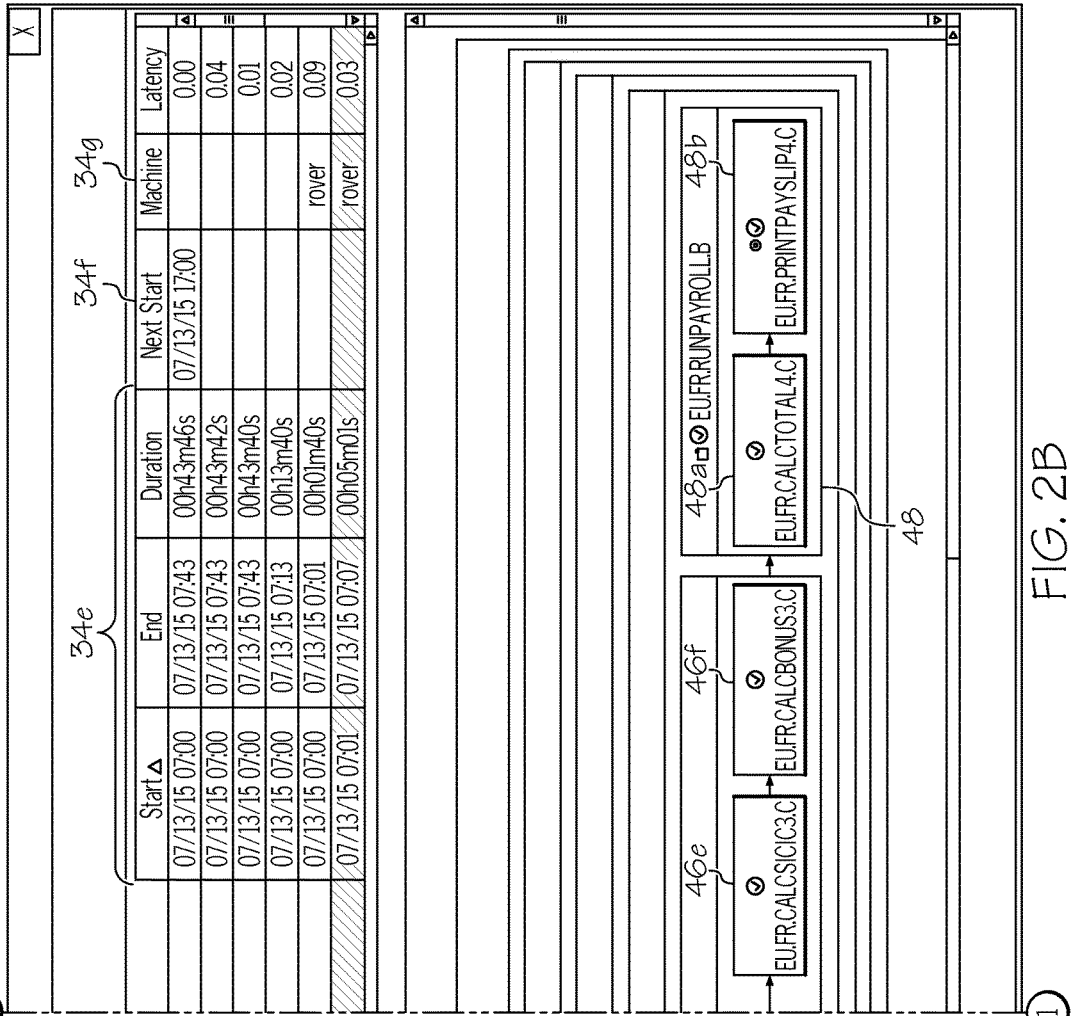

FIGS. 2A-2B illustrate a view 32 for a GUI 30 according to one embodiment of the present disclosure. The view 32 is generated and output to a display device by control computer 110 responsive to a command for the view 32. In one embodiment, the command to display view 32 is a user command and specifies a particular job. The job may be a single job comprising one or more application programs that execute in performance of the job, or may itself be a "top-level" job comprising a plurality of related "sub-jobs." Each of the sub-jobs may comprise one or more application programs and are executed in sequence in performance of the job.

As seen in FIGS. 2A-2B, view 32 comprises a first section 34 and a second section 36, each of which graphically represents job execution data for a job 38. The job execution data, as stated above, is retrieved by control computer 110 from a job scheduler. In this embodiment, the first section 34 displays the job execution data as text in a table that comprises a plurality of columns 34a, 34b, 34c, 34d, 34e, 34f, and 34g. The progress column 34a indicates the execution status of a job or sub-job as a percentage. The instance column 34b identifies an instance of the job or sub-job, which is then particularly identified by name in the job name column 34c. Together, the instance column 34b and the job name column 34c uniquely identify a given job or sub-job. The status column 34d indicates whether the execution of the job or sub-job identified by the values in the instance column 34b and the job name column 34c succeeded or failed. The time column 34e indicates the execution start and end times, as well as the duration of execution, of each job and sub-job, while the next start column 34f identifies the time for the next scheduled run of the job. The machine column 36g identifies the particular computing device that is executing the job, and in some cases, may be used in conjunction with the instance column 34b and the job name column 34c uniquely identify a given job or sub-job.

Of course, those of ordinary skill in the art should appreciate that the particular columns and their ordering seen in FIGS. 2A-2B are illustrative only. Various views 32 may have different columns in addition to, or in lieu of, those seen in FIGS. 2A-2B. It is enough to understand that the information seen in first section 34 is retrieved by control computer 110 for display in the view 32.

The second section 36 of view 32 is generated by control computer 110 to comprise a graphical representation of the hierarchical interdependencies of the sub-jobs to the top level job 38 and to each other. Particularly, in this embodiment, the top level job 38 comprises a plurality of sub-jobs 40, 42, 44, 46, and 48. In turn, one or more of the sub-jobs may themselves comprise one or more sub-jobs. For example, as seen in FIGS. 2A-2B, sub-job 46 comprises sub-jobs 46a, 46b, 46c, 46d, 46e, and 46f, while sub-job 48 comprises sub-jobs 48a and 48b.

The execution of one or more of the sub-jobs, in this embodiment, is dependent on the successful execution of a previous sub-job. That is, if the execution of a first sub-job fails (e.g., sub-job 46b returns a fail code), one or more subsequent sub-jobs (e.g., sub-job 46c) that rely on the successful execution of the first sub-job 46b may not execute. Similarly, as the top level job 38 in this embodiment is also dependent on the successful execution of each of its sub-jobs 40, 42, 44, 46, 48, it, too, would fail.

With conventional GUIs, only those users that are sufficiently authorized for the top level job 38 and each of its sub-jobs 40, 42, 44, 46, 48 would able to determine, simply by looking at view 32, the particular point of failure (e.g., sub-job 46b). This allows such users to address the problem or issue that caused the failure. Users that lack sufficient authorization for sub-job 46b, however, would not be able to see that particular sub-job on view 32. Thus, these users may not be able to determine why the job and sub-jobs (e.g., sub-job 48) for which the user does has sufficient authorization failed to execute. Accordingly, control computer 110 configured according to embodiments of the present disclosure permits users access to the job execution data of each of the jobs and sub-jobs, at least at an "informational" level, regardless of the user's assigned permissions level.

Figure 3:
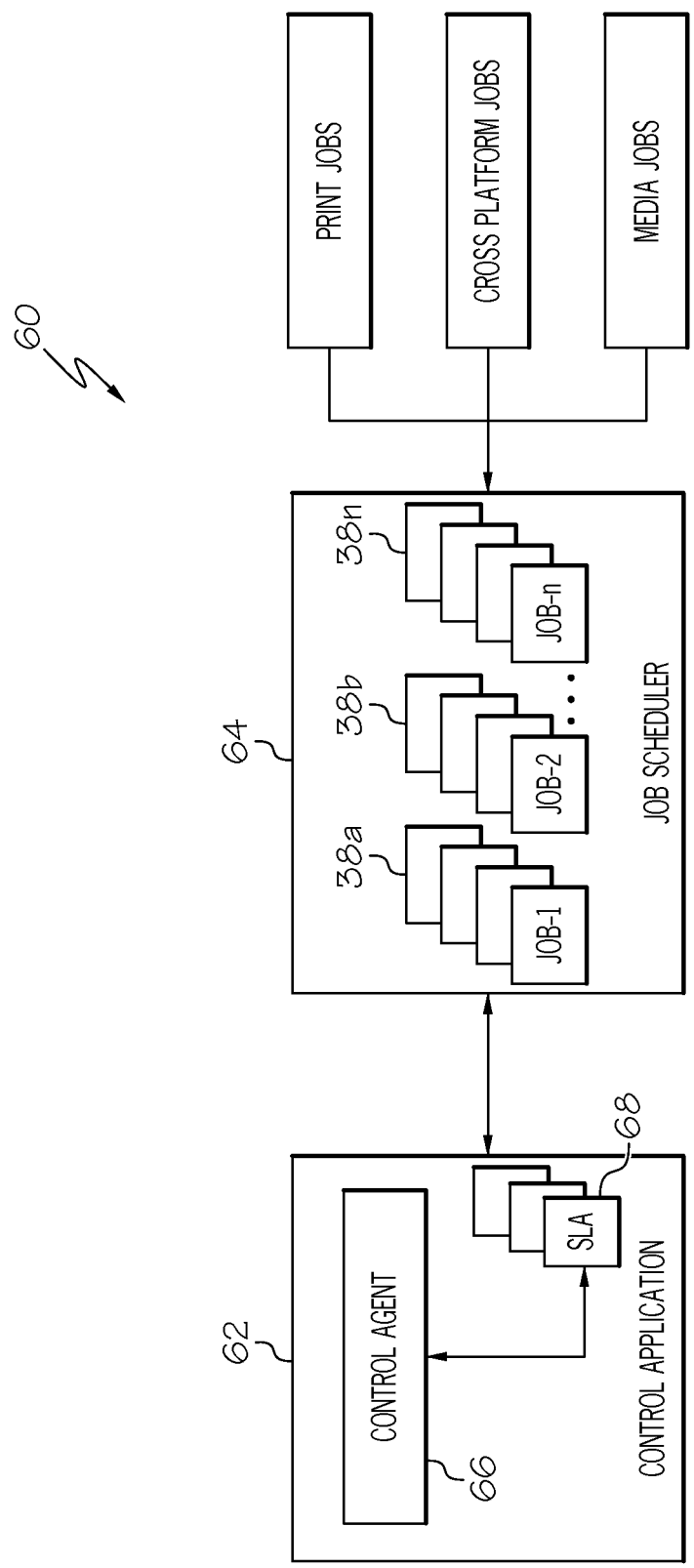
FIG. 3 is a functional block diagram illustrating an architecture according to one embodiment of the present disclosure.

FIG. 3 illustrates an exemplary architecture 60 for one embodiment of the present disclosure. Particularly, control computer 110 executes a control application 62 that monitors a job scheduler 64. As stated above, the job scheduler 64 automates and controls the execution of one or more jobs 38a, 38b . . . 38n, each of which may themselves comprise one or more other jobs (e.g., print jobs, cross platform jobs, media jobs, and the like). In operation, the control application 62 monitors the job scheduler 64, and from time to time, requests and receives job execution data about each of the jobs for use in generating view 32. As previously stated, the request for the job execution data may be made by control application 62 responsive to receiving a user command.

As seen in FIG. 3, the control application 62 can access the information stored in one or more profiles, such as user profile 66 and Service Level Agreement (SLA) 68. According to embodiments of the present disclosure, the user profiles 66 and the SLAs 68 store information that is utilized by the control application 62 to generate the view 32.

More specifically, the user profile 66 stores the user's permissions level with respect to the various jobs 38a, 38b . . . 38n. This may be accomplished by any means known in the art. However, as seen in the following table, the user profile 66 according to one embodiment comprises a list of names of the jobs for which the user is authorized, and in indication of the job privilege level for each job. In this embodiment, the user may have read (R) and/or write (W) privileges.

TABLE 1

| MACHINE ID | INSTANCE ID | JOB NAME | JOB PRIVILEGE LEVEL |
|---|---|---|---|
| ROVER | AS-2 | JOB-1 | R-W |
| ROVER | AS-2 | JOB-2 | R-W |
| VIKING | AS-10 | JOB-3 | R |
| ROVER | AS-3 | JOB-4 | R-W |
| . . . | . . . | . . . | |

To determine whether a user is authorized access to a particular job, the control application 62 compares the name of a job received from the job scheduler 64 to those that are on the list for the user. If there is a match, the user may be considered authorized to view the job execution data for that job. Such jobs are referred to herein as "authorized jobs." If there is no match, the user is not authorized to view the job execution data for that job. These jobs are referred to herein as "restricted jobs."

The SLAs 68 store information that defines milestones and policies for the execution of various jobs 38a, 38b . . . 38n. By way of example only, a given SLA 68 may define a grouping of related jobs and/or sub-jobs for a particular top level job (e.g., job 38), the hierarchy for the jobs and/or sub-jobs in that grouping, and identify which jobs and/or sub-jobs depend on which other jobs and/or sub-jobs. SLAs may also specify compliance requirements, compliance methods, operating time periods, Quality of Service (QoS) constraints, expected values, and the like.

Figure 4:
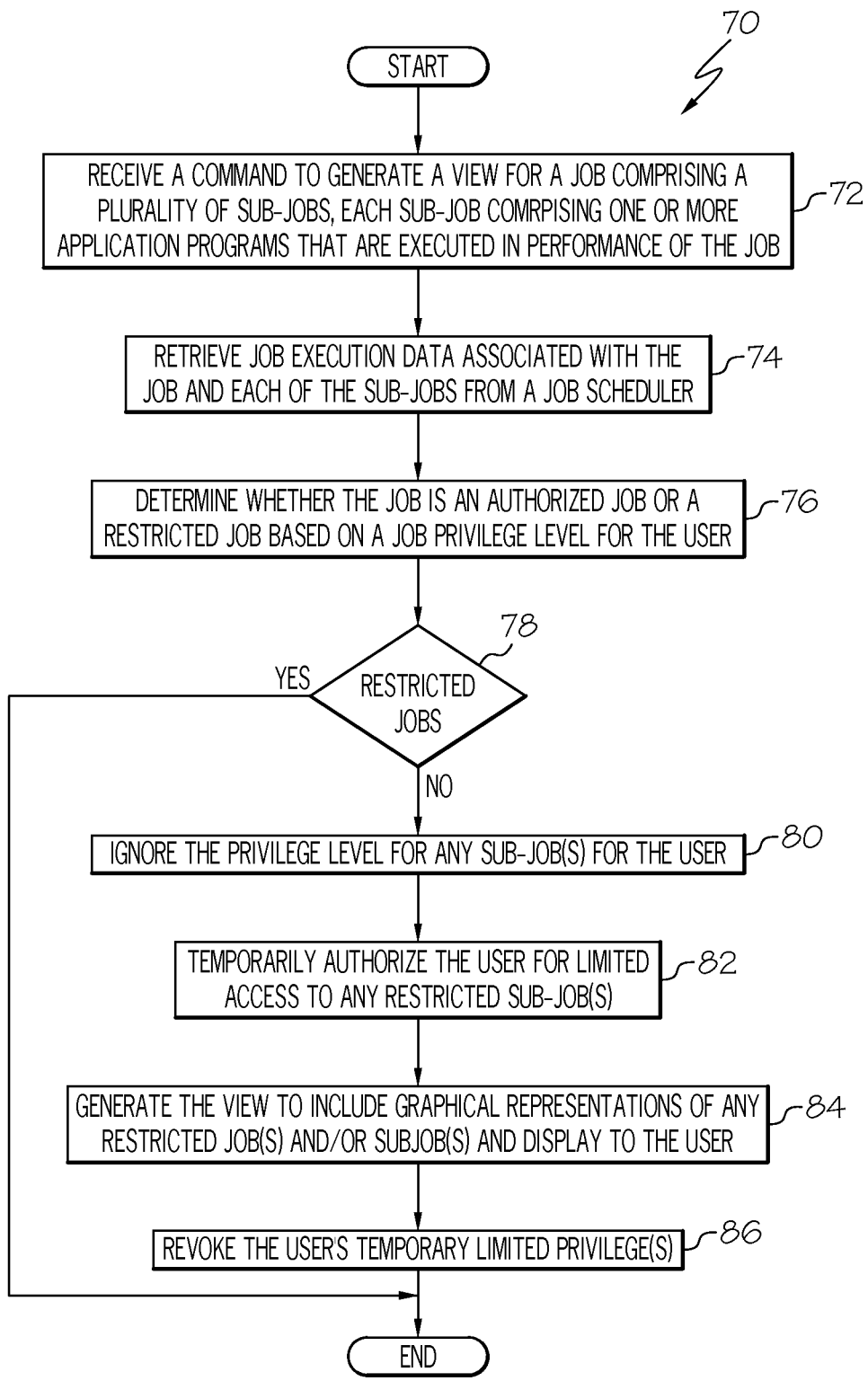
FIG. 4 is a flow diagram illustrating a method for generating a view for a GUI according to one embodiment of the present disclosure.

FIG. 4 is a flow diagram illustrating a method 70 for generating a view 32 to include both authorized jobs and restricted jobs according to one embodiment of the present disclosure. Method 70 begins with the control application 62 executing on control computer 110 receiving a command to generate the view 32 (box 72). As stated above, the command may be received via a user interface from a user, but may also be received from another computing device. Responsive to receiving the command, control application 62 generates a request message to send to the job scheduler 64 that requests the job execution data for a specified job (box 74). The job specified in the request message may comprise a single job, or may comprise a top level job, such as job 38, that comprises one or more other jobs and/or sub-jobs. At any rate, the job scheduler 64 will reply with a response message that carries the requested job execution data for each of the jobs and/or sub-jobs.

Upon receipt of the information, the control application 62 determines whether the job is an "authorized job" or a "restricted job" (box 76). As stated above, this determination may be accomplished by comparing the name of the job retrieved from job scheduler 64 to the list of job names stored in user profile 66. If the results of the comparison reveal that the user does not have sufficient authorization for the job (box 78), the method 70 simply ends. On the other hand, if the results of the comparison reveal that the job is an authorized job (i.e., a job for which the user has sufficient authorization) (box 78), control application 62 will ensure that the user can at least view all of the sub-jobs that are part of the job—even those sub-jobs for which the user may not normally have sufficient permissions.

To accomplish this aspect of the disclosure, the control application 62 is configured to ignore the job privilege level that was read from the user profile 66 for all of the sub-jobs that are part of the authorized job (box 80). The control application 62 then automatically temporarily authorizes the user for limited access to each of the sub-jobs (box 82). For example, control application 62 may temporarily provide the user with "read-only" access to any jobs and/or sub-jobs that are considered restricted jobs for the user. Such read-only access will allow the control application 62 to generate the "informational" graphical indicators required for generating view 32 with the restricted jobs, while still preventing the user from being able to control or otherwise change the functions and aspects (e.g., start-stop times, names, etc.) of the restricted jobs. Once the user has been provided with the temporary job privilege levels for each of the restricted jobs, control application 62 will generate view 32 to display the job execution data and the graphical representations of both the authorized jobs and the restricted jobs (box 84). The user is then free to look at the information. However, once the user closes the view, control application 62 revokes the user's temporary authorization and returns the user to his or her assigned privileges (box 86).

Figure 5:
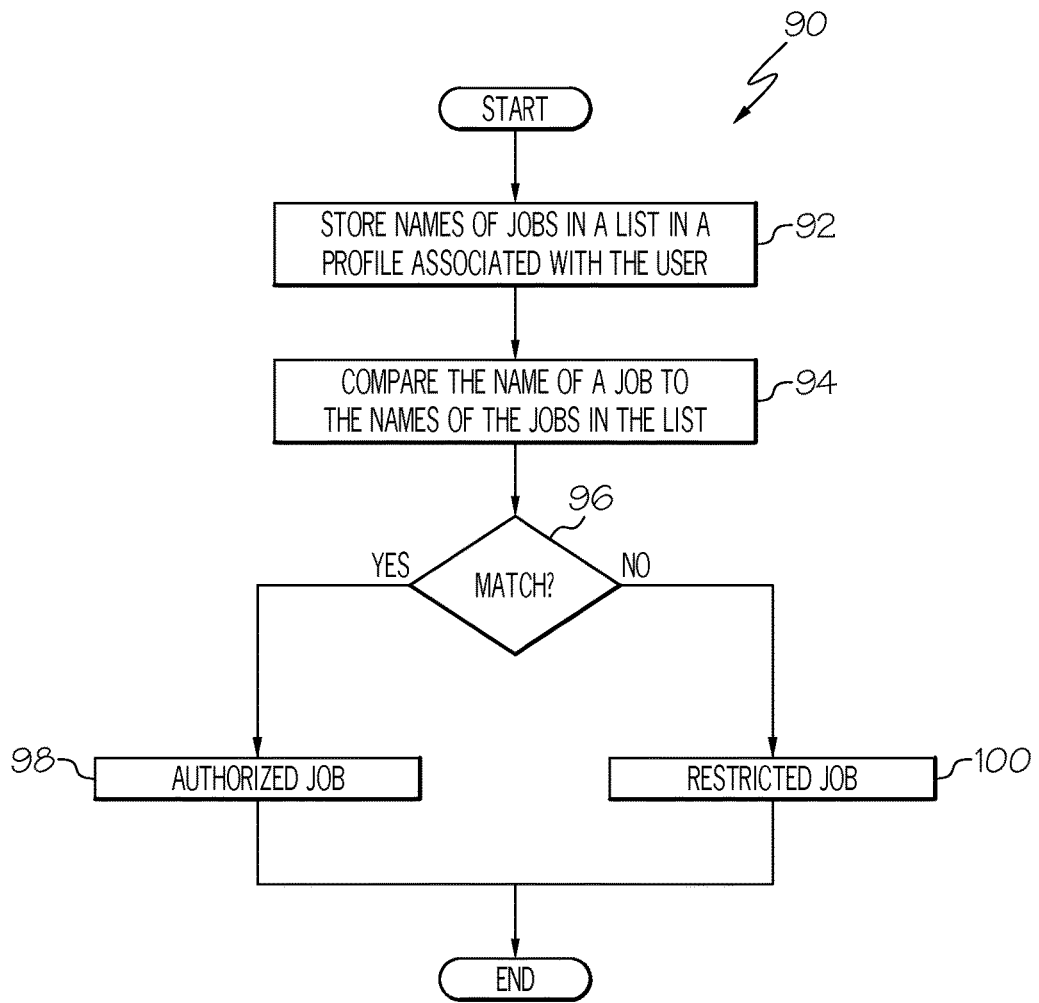
FIG. 5 is a flow diagram illustrating a method for determining whether a user is authorized to access or view a given job and the data associated with that job according to one embodiment.

FIG. 5 is a flow diagram illustrating a method 90 for determining whether a job is an authorized job or a restricted job. Method 90 is performed by the control computer 110 and comprises storing the names of all of the jobs for which the user is permitted to access in a memory circuit (box 92). For example, the names may be stored in a table, such as Table 1 above, and may be performed as part of a provisioning process when the user is added to the system. Further, the names and information in the table may change over time by the user, by another user, and/or by an application program that periodically monitors that information.

Thereafter, to determine whether a given job is or is not an authorized job for the user, the control application 62 will compare the name of the job to the names of the jobs stored in the user profile (box 94). If the comparison yields a match (box 96), the job is considered to be an authorized job for the user (box 98), and all the sub-jobs that may be part of the authorized job will automatically be temporarily authorized for the user to a limited extent, as previously described. Otherwise, the job is considered to be a restricted job for the user (box 100).

Figure 6:
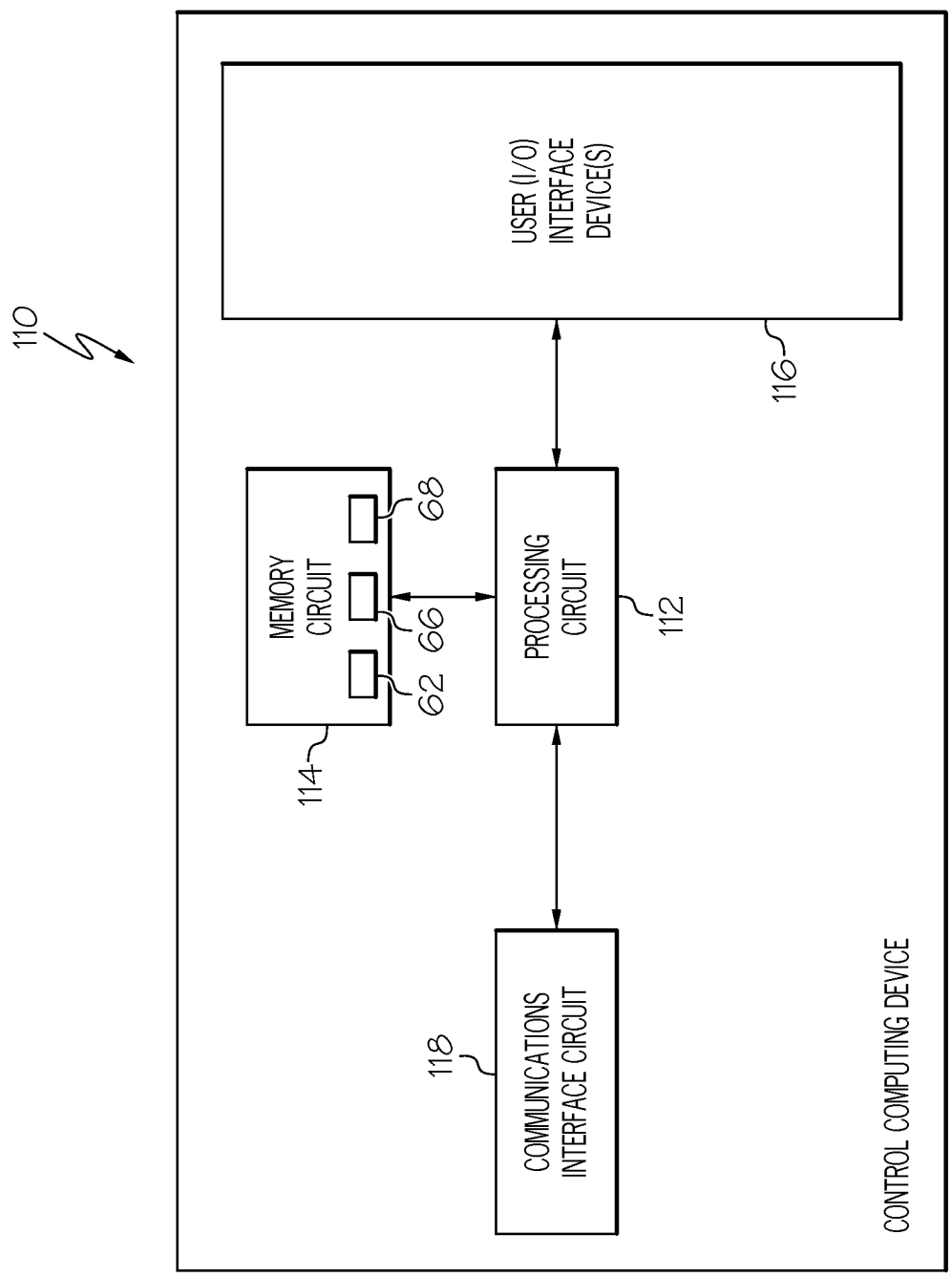
FIG. 6 is a functional block diagram illustrating a computing device configured according to one embodiment of the present disclosure.

FIG. 6 is a functional block diagram of a device, such as control computer 110, configured to perform the embodiments of the present disclosure. As seen in FIG. 6, control computer 110 comprises, inter alia, a processing circuit 112, a memory circuit 114, a user Input/Output (I/O) interface 116, and a communications circuit 118. Those skilled in the art will readily appreciate that control computer 110 is not limited solely to the components seen in the figure, but rather, may comprise other hardware and/or software components as needed or desired.

Processing circuit 112 may be implemented by circuitry comprising one or more microprocessors, hardware, firmware, or a combination thereof. Generally, processing circuit 112 controls the operation and functions of the control computer 110 according to appropriate standards. Such operations and functions include, but are not limited to, communicating with the server device 30, and if needed, one or more of the user terminals 14, 16 via network 12. Additionally, according to various embodiments of the present disclosure, processing circuit 112 is configured to execute control application 62 to perform the method of the present disclosure according to the embodiments as previously described.

Memory 114 may comprise any non-transitory, solid state memory or computer readable storage media known in the art. Suitable examples of such media include, but are not limited to, ROM, DRAM, Flash, or a device capable of reading computer-readable storage media, such as optical or magnetic storage media. Memory circuit 114 stores programs and instructions, such as the control program 62 previously mentioned, which configures the processing circuit 114 to generate view 32 according to the embodiments previously described. Additionally, memory circuit 114 may store one or more user profiles 66 and one or more SLAs 68, as previously described. As previously described, the information in these files may be used by control application 62 to generate view 32 according to the present disclosure.

The user I/O interface 116 comprises the components necessary for a user to interact with control computer 110. Such components include, but are not limited to, a display device that displays GUI 30 and view 32 previously described, a keyboard, a mouse, and any other input mechanisms that facilitate the user's ability to interact with control computer 110 according to embodiments of the present disclosure. For example, the user may enter a command to cause control computer 110 to generate the view 32, as previously described.

The communications interface circuitry 118 may comprise, for example, an I/O card or other interface circuit configured to communicate data and information with the server device 30 and one or more of the user terminals 14, 16 via network 12. As those of ordinary skill in the art will readily appreciate, the communications interface circuit 118 may communicate with these and other entities using any known protocol needed or desired. In one embodiment, however, communications interface circuitry 118 sends data to and receives data from such remote computing devices via network 12 in data packets according to the well-known ETHERNET protocol. In this regard, communications interface circuitry 112 may comprise an ETHERNET card, but may also comprise circuitry capable of wireless communications such as over WiFi, for example.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
receiving a command to generate a view for a job comprising a plurality of constituent sub-jobs, wherein each constituent sub-job is hierarchically related to the job, and comprises an application program that is executed in sequence by a job scheduler to perform the job, and wherein the plurality of constituent sub-jobs comprises a restricted sub-job that a user is not authorized to access;
responsive to receiving the command to generate the view:
determining whether the job is an authorized job that the user is authorized to access, or a restricted job that the user is not authorized to access, based on a job privilege level for the job assigned to the user;
responsive to determining that the job is an authorized job that the user is authorized to access:
ignoring the job privilege level for the user;
temporarily authorizing the user for limited access to the restricted sub-job; and
generating the view for display to the user, wherein the view comprises a graphical indicator representing job execution data for the restricted sub-job; and
outputting the view on a graphical user interface (GUI) on a display device to the user.

2. The computer-implemented method of claim 1 wherein determining whether the job is an authorized job or a restricted job comprises:
storing a list of job names for jobs that the user is authorized to access in a user profile;
comparing a name of the job to the list of job names stored in the user profile;
determining that the job is an authorized job if the name of the job matches a job name on the list; and
determining that the job is a restricted job if the name of the job does not match a job name on the list.

3. The computer-implemented method of claim 1 further comprising revoking the temporary authorization of the restricted sub-job responsive to receiving a command to close the view.

4. The computer-implemented method of claim 1 further comprising retrieving the job execution data for the restricted sub-job from the job scheduler.

5. The computer-implemented method of claim 1 wherein the job execution data comprises data identifying the job, each of the constituent sub-jobs, and a computing device executing the job.

6. The computer-implemented method of claim 5 wherein the job execution data further comprises execution details for the restricted sub-job.

7. The computer-implemented method of claim 1 wherein the view that is generated for display to the user comprises:
a first section configured to display the job execution data of the restricted sub-job in tabular form; and
a second section configured to graphically represent hierarchical interdependencies of each of the constituent sub-jobs to the job and to each other.

8. The computer-implemented method of claim 1 wherein generating the view for display to the user comprises:

retrieving information for the job from a service profile;
generating the view for display to the user based on the policy information.

9. The computer-implemented method of claim 8 wherein the information identifies one or more of:
a grouping of one or both of related jobs and sub-jobs for the job;
a hierarchy for the one or both of the related jobs and sub-jobs in the grouping; and
dependencies between the job and the sub-jobs.

10. A computing device comprising:
a communications interface circuit configured to communicate data with a job scheduler; and
a processing circuit operatively connected to the communications interface circuit and configured to:
receive a command to generate a view for a job comprising a plurality of constituent sub-jobs, wherein each constituent sub-job is hierarchically related to the iob, and comprises an application program that is executed in sequence by the job scheduler to perform the job, and wherein the plurality of constituent sub-jobs comprises a restricted sub-job that a user is not authorized to access;
responsive to receiving the command to generate the view:
determine whether the job is an authorized job that a user is authorized to access, or a restricted job that the user is not authorized to access, based on a job privilege level for the job assigned to the user;
responsive to determining that the job is a restricted job:
ignore the job privilege level for the user;
temporarily authorize the user for limited access to the restricted sub-job; and
generate the view for display to the user, wherein the view comprises a graphical indicator representing job execution data for the restricted job; and
output the view to a graphical user interface (GUI) on a display device.

11. The computing device of claim 10 wherein the processing circuit is further configured to:
store a list of job names for jobs that the user is authorized to access in a user profile;
compare a name of the job to the list of job names stored in the user profile;
determine that the job is an authorized job if the name of the job matches a job name on the list; and
determine that the job is a restricted job if the name of the job does not match a job name on the list.

12. The computing device of claim 11 wherein the processing circuit is further configured to revoke the temporary authorization of the restricted sub-job responsive to receiving a command to close the view.

13. The computing device of claim 10 wherein the processing circuit is further configured to retrieve the job execution data for the restricted sub-job from the job scheduler.

14. A non-transitory computer-readable storage medium comprising computer program code stored thereon that, when executed by a processing circuit of a computing device, configures the processing circuit to:
receive a command to generate a view for a job, wherein the job comprises a plurality of constituent sub-jobs, wherein each constituent sub-job is hierarchically related to the job, and comprises an application program that is executed in sequence by a job scheduler to perform the job, and wherein the plurality of constituent sub-jobs comprises a restricted sub-job that a user is not authorized to access;

responsive to receiving the command to generate the view:
- determine whether the job is an authorized job that a user is authorized to access, or a restricted job that the user is not authorized to access, based on a job privilege level for the job assigned to the user;
- responsive to determining that the job is an authorized job that the user is authorized to access:
  - ignore the job privilege level for the user;
  - temporarily authorize the user for limited access to the restricted sub-job; and
  - generate the view for display to the user, wherein the view comprises a graphical indicator representing job execution data for the restricted sub-job; and
- output the view to a graphical user interface (GUI) on a display device.

15. The computer-readable storage medium of claim 14 wherein the computer program code further configures the processing circuit to
retrieve the job execution data for the restricted sub-job from the job scheduler.

* * * * *